United States Patent [19]
Miyake et al.

[11] Patent Number: 5,331,621
[45] Date of Patent: Jul. 19, 1994

[54] OPTICAL PICKUP APPARATUS AND A HOLOGRAM ELEMENT USED FOR SAME

[75] Inventors: Takahiro Miyake, Soraku; Yoshio Yoshida, Nara; Katushiro Kubo, Yamatokoriyama; Tetsuo Ueyama, Nara; Yukio Kubata, Tenri, all of Japan

[73] Assignee: Sharp Kabushiki Kaisha, Osaka, Japan

[21] Appl. No.: 983,423

[22] Filed: Dec. 2, 1992

[30] Foreign Application Priority Data

Dec. 4, 1991 [JP] Japan .................................. 3-320226

[51] Int. Cl.$^5$ .................................................. G11B 7/13
[52] U.S. Cl. ......................................... 369/112; 369/103; 369/44.12; 359/15
[58] Field of Search ............... 369/103, 105, 109, 110, 369/112, 119, 44.14, 44.17, 44.18, 44.21, 44.23, 44.37, 44.12, 44.28; 359/15, 17, 18, 19

[56] References Cited

U.S. PATENT DOCUMENTS

| | | | |
|---|---|---|---|
| 4,420,829 | 12/1983 | Carlson | 369/103 |
| 4,540,247 | 9/1985 | Nishi et al. | 359/210 |
| 5,064,258 | 11/1991 | Inokuchi et al. | 369/103 |

FOREIGN PATENT DOCUMENTS 0341820  11/1989  European Pat. Off. .

OTHER PUBLICATIONS

Patent Abstracts of Japan, vol. 13, No. 135, Apr. 1989 & JP-A-63 303 317 (Sharp Corp.) Dec. 9, 1988 (Abstract).
Patent Abstracts of Japan, vol. 13, No. 472, Oct. 25, 1989 & JP-A-1184 729 (Mitsubishi Electric Corp.) Jul. 24, 1989 (Abstract).
Patent Abstracts of Japan, vol. 11, No. 313, Oct. 13, 1987 & JP-A-62 103 856 (Fujitsu Ltd.) May 14, 1987 (Abstract).
Patent Abstracts of Japan, vol. 14, No. 98, Feb. 22, 1990 & JP-A-13 03 638 (Matsushita Electric Ind Co. Ltd)., Dec. 7, 1989 (Abstract).
Imaging, Part 3, Funado: "A holographic lens system scanner," pp. 28-35 Dec. 20, 1988.

*Primary Examiner*—Paul M. Dzierzynski
*Assistant Examiner*—Don Wong
*Attorney, Agent, or Firm*—Nixon & Vanderhye

[57] ABSTRACT

An optical pickup apparatus including a light emitting source, a hologram element for scanning a recording medium with light beams emitted from the light emitting source, a hologram lens for focusing the light beams introduced from the hologram element on the recording medium, an optical detector for detecting the light beams reflected from the recording medium, and a first optical system for directing the light beams reflected from the recording medium to the optical detector. The hologram element includes an optical diffraction grating for diffracting the light beams emitted from the light emitting source and a control means for controlling the rotation of the hologram element in a swinging manner. The hologram element can have hologram gratings on both surfaces thereof; one of them has a pattern of straight lines and the other has a pattern of concentric circles to obtain a widened deflection angle.

16 Claims, 10 Drawing Sheets

OPTICAL PICKUP APPARATUS AND A HOLOGRAM ELEMENT USED FOR SAME

BACKGROUND OF THE INVENTION

1. Field of the Invention

The present invention relates to an optical pickup apparatus for an optical disk unit, and more particularly, to an optical pickup apparatus for a small and thin optical disk unit capable of high-speed seeking, and a hologram element used for such an optical pickup apparatus.

2. Description of the Related Art

An optical disk is a medium having a large capacity and being replaceable. In recent years, with the development of a rewriteable magneto-optical disk or phase change disk, and the like, the application of the optical disk has expanded from the conventional use for filing images, etc. to an external memory for a computer.

In a conventional optical disk unit using such an optical disk, the optical disk has been tracked or accessed by electromagnetically driving the whole or a part of an optical system, typically with a linear motor. However, with a recent demand for an optical disk with a smaller size and a larger capacity to be used for an external memory for a computer, the above driving method has become insufficient for providing a thrust large enough to drive the optical system effectively, causing reduction of the access speed of the optical disk unit.

Figure 11A:
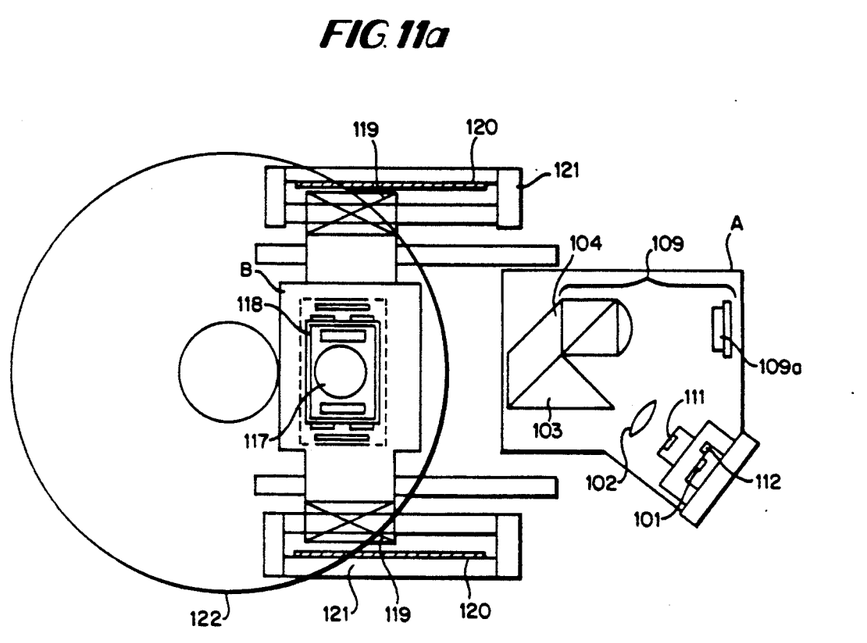
FIGS. 11a and 11b are a plan view and a side view, respectively, of a conventional optical pickup apparatus for a magneto-optical disk unit.
Figure 11B:
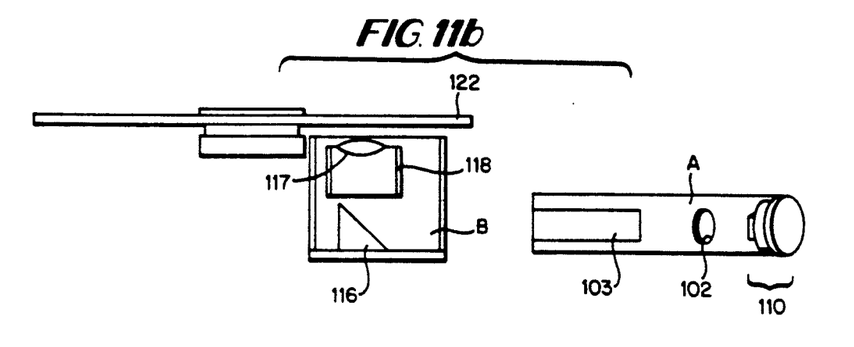

One example of such a conventional optical disk unit is shown in FIGS. 11a and 11b, which are a plan view and a side view, respectively. The optical system as an optical pickup apparatus used in this example is a so-called separation-type optical system which includes a fixed optical system A and a movable optical system B separated from the fixed optical systems A for increasing the access speed. The movable optical system B comprises an objective lens 117, an actuator 118 for the drive control of the objective lens 117 both in the focusing direction and in the radial direction (tracking direction), and a 45° mirror 116. The movable optical system B is designed to he as light as possible. The fixed optical system A comprises a hologram laser unit 110, a collimator lens 102, a shaping prism 103, a polarization beam splitter 104, and a data signal detecting optical system 109. The hologram laser unit 110 includes a hologram element 111, a semiconductor laser 101, and an optical detector 112, all of which are integrally formed to reduce the number of components and thus to make the optical pickup apparatus small and light.

The operation of the above-described optical pickup apparatus will be described as follows:

Light beams emitted from the semiconductor laser 101 of the hologram laser unit 110 pass through the shaping prism 103 and the polarization beam splitter 104 of the fixed optical system A to the movable optical system B, where they are reflected from the 45° mirror 116 and then focused on an optical disk 122 through the objective lens 117. Then, the light beams reflected from the optical disk 122 return along the above-described optical path reversely to the fixed optical systems A, where a data signal component carried by the light beams is directed to the data signal detecting optical system 109 for detecting the data signal. On the other hand, a tracking or focusing signal carried by the light beams passes through the polarization beam splitter 104 and are diffracted at the hologram element 111 toward the optical detector 112 in the hologram laser unit 110. The optical detector 112 then detects the tracking or focusing signal, i.e., a servo signal, and according to this signal, the actuator 118 for tracking and focusing effects the drive and servo control of the objective lens 117. When it is required to widely change the position to be irradiated with the light beams on the optical disk 122, such as track-jumping and seeking, the entire movable optical system B is moved with a linear motor driving system including a coil 119, a magnet 120, and a yoke 121.

Conventionally, some efforts such as separating the movable optical system from the fixed optical system as described above have been made for achieving a small and thin optical pickup apparatus with increased access speed. To meet the demand for a smaller and thinner optical pickup apparatus, the actuator and the 45° mirror should be thinner. To meet another demand for increasing the access speed, the movable optical system should be as light as possible, and at the same time the thrust of the linear motor should be increased. To increase the thrust, both the coil and the magnet for the linear motor must be large, which conflicts with the former requirement. As a result, achieving a small and light optical pickup apparatus with increased access speed is not possible with the conventional optical pickup apparatus.

SUMNARY OF THE INVENTION

The optical pickup apparatus of this invention comprises a light emitting means for emitting light beams; an optical scanning means for scanning a recording medium with asia light beams; a light focusing means for focusing said light beams on said recording medium; an optical detector for detecting the light beams reflected from said recording medium; and a first optical system for directing the light beams reflected from said recording medium to said optical detector; wherein said optical scanning means comprises an optical diffraction means for diffracting the light beams emitted from said light emitting means and a control means for controlling the rotation of said optical diffraction means.

Alternatively, a hologram element for optical scanning is provided, which is rotated under control, the hologram element comprising; a light-transmitting substrate having a first surface with a first hologram formed thereon and a second surface with a second hologram formed thereon; wherein The first hologram has a grating of approximately straight lines, and the second hologram has a grating of concentric circles having a center on an imaginary straight line, said straight line being perpendicular to the straight lines of the grating of the first hologram and including a center of the rotation of said hologram element.

According to the optical pickup apparatus of the present invention, optical scanning is possible without a linear motor for accessing the recording medium nor an actuator for tracking. This makes it possible to achieve a small and lightweight optical scanning system with increased access speed compared with a conventional one. Moreover, by forming hologram gratings on both surfaces of the hologram element, an optical scanning system with further increased access speed can be realized.

Thus, the invention described herein makes possible the advantages of (1) providing a small and thin optical pickup apparatus with increased access speed and (2) providing a hologram element for realizing such an optical pickup apparatus.

These and other advantages of the present invention will become apparent to those skilled in the art upon reading and understanding the following detailed description with reference to the accompanying FIGURES.

DESCRIPTION OF THE PREFERRED EMBODIMENTS

Examples of the optical pickup apparatus according to the present invention will be described with reference to the accompanying drawings.

EXAMPLE 1

Figure 1A:
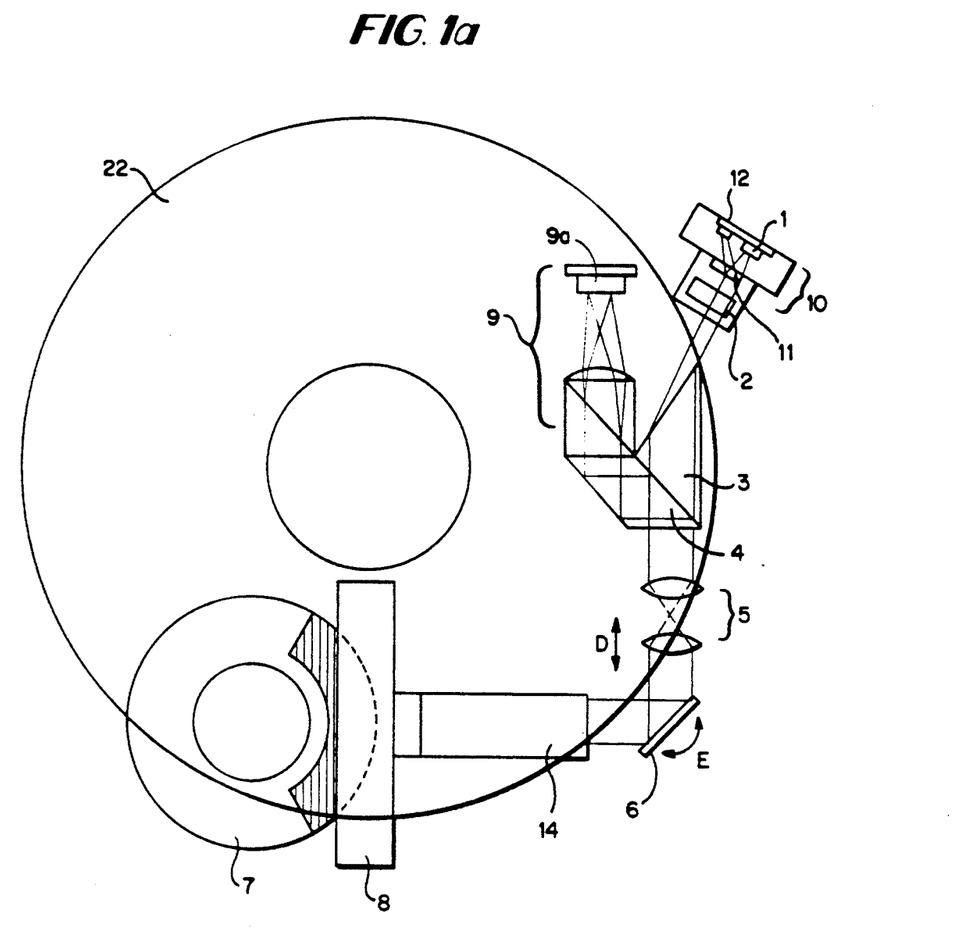
FIGS. 1a and 1b are a plan view and a side view, respectively, of an optical pickup apparatus according to the present invention.
Figure 1B:
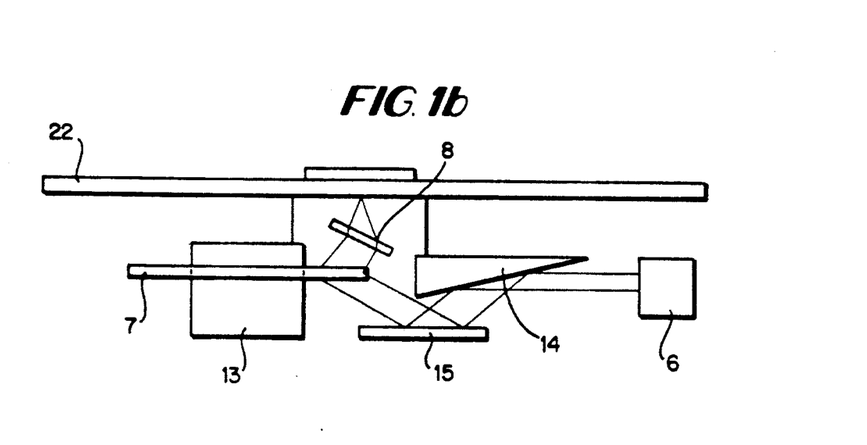
Figure 12A:
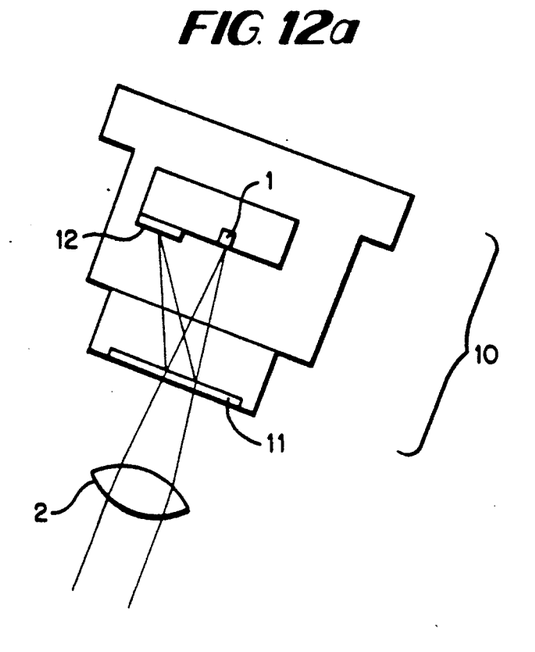
FIGS. 12a and 12b are enlarged plan views of a hologram laser unit for the optical pickup apparatuses of FIG. 1a and FIG. 2a, respectively.

FIGS. 1a and 1b are a plan view and a side view, respectively, of an optical pickup apparatus according to the present invention used for a magneto-optical disk unit. Referring to these FIGURES, light beams emitted from a semiconductor laser 1 of a hologram laser unit 10 pass through a collimator lens 2, a shaping prism 3, a polarization beam splitter 4, and a relay lens arrangement 5 for the focusing control, and than reflected from a galvano-mirror 6 for the tracking control, a 15° mirror 14, and a total reflection mirror ! 5 to reach a hologram scanning element 7. The hologram scanning element 7 diffracts the incident light beams, and the diffracted light beams are focused on an optical disk 22 through a hologram lens 8 disposed above the hologram scanning element 7. In consideration of the diffraction efficiency, each of the hologram scanning element 7 and the hologram lens 8 is designed to receive the light beams at such an incident angle as that the incident light beams are diffracted at the Bragg angle or an angle closer to the Bragg angle in the vicinity of the optical axis of the light beams. The hologram laser unit 10 can be constructed is shown in FIG. 12a.

The light beams reflected from the optical disk 22 return the above-described optical path reversely to reach the polarization beam splitter 4, where a data signal component carried by the light beams is directed to a data signal detecting optical system 9 for detecting the data signal with an optical detecting element 9a. On the other hand, a tracking or focusing signal component carried by the light beams passes through the polarization beam splitter 4 and is diffracted at a hologram element 11 toward an optical detector 12 in the hologram laser unit 10. The optical detector 12 then detects the tracking or focusing signal, i.e., a servo signal. According to this signal, the relay lens arrangement 5 is moved in the directions shown by a double-arrow D to effect the focusing control. The movement of the relay lens arrangement 5 is driven and controlled by an actuator (not shown) which is conventionally used for the focusing control of an objective lens. Likewise, according to the servo signal, the galvano-mirror 6 is moved in the directions shown by a double-arrow E to effect the tracking control. When it is required to widely change the position to be irradiated with light beams on the optical disk 22, such as track-Jumping or seeking, the hologram scanning element 7 is rotated to change the direction of the light beams diffracted from the hologram scanning element 7, so that the light beams are focused on a specified position on the optical disk 22.

In this example, the optical pickup apparatus according to the present invention was used for a normal magneto-optical disk unit. However, the optical pickup apparatus of this example is also applicable to other types of optical disks such as e compact disk (CD), a write once optical disk, or a phase change optical disk by, for example, removing the polarization beam splitter 4 and the data signal detecting optical system 9 from the optical pickup apparatus shown in FIGS. 1a and 1b. Also, one of the relay lens arrangement 5 for the focusing control can be moved in the direction corresponding to the track direction of the optical disk 22 so as to effect the tracking control in addition to the focusing control by the relay lens arrangement 5. An acoustooptic element can be used in place of the galvano-mirror 6 to deflect the light beams for the tracking control.

Next, the principle of the operation of the hologram scanning element 7 for introducing the light beams to the hologram lens 8 will be described.

Figure 4A:
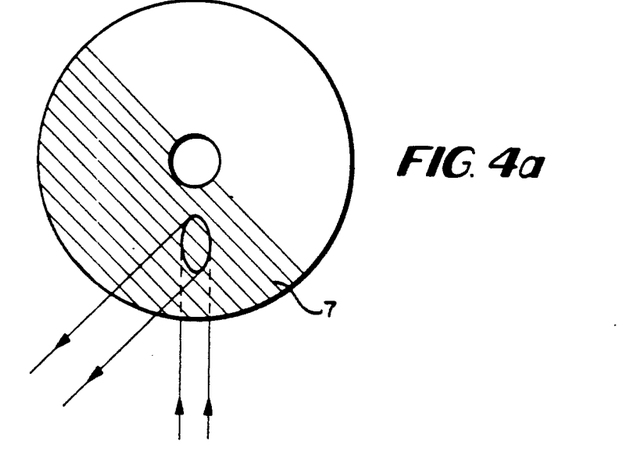
FIGS. 4a to 4c show the principle of the operation of a hologram scanning element according to the present invention.
Figure 4B:
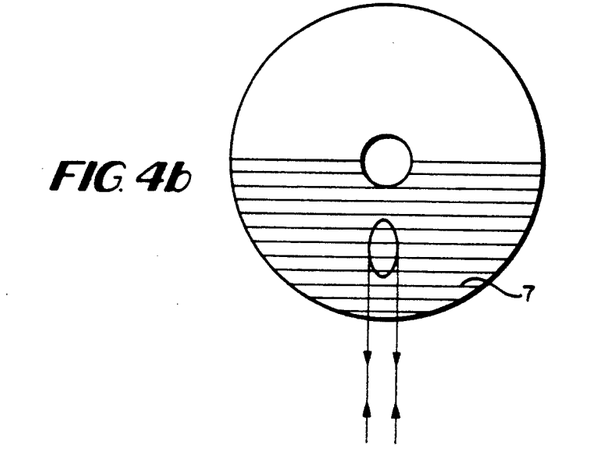
Figure 4C:
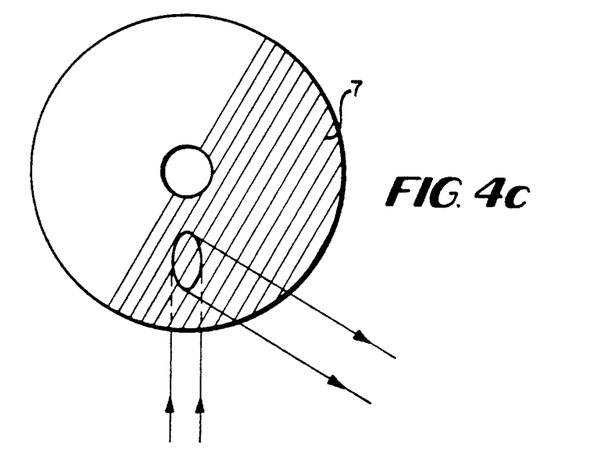

FIGS. 4a, 4b, and 4c are schematic plan views of the hologram scanning element 7 illustrating the relationship between the light beams incident to the hologram scanning element 7 and those diffracted therefrom. When the diffraction grating of the hologram scanning element 7 has a pattern of parallel straight lines as shown in FIGS. 4a to 4c, the incident light beams diffract from the hologram scanning element 7 in the direction perpendicular to the straight lines of the grating. Accordingly, when the straight lines of the grating of the hologram scanning element 7 are perpendicular to the direction of the incident light beams as shown in FIG. 4b, the incident light beams are diffracted in the direction perpendicular to the straight lines of the grating, that is, in the direction in which they are introduced, on the x-y plane. They are diffracted at the Bragg angle in the z direction. When the hologram scanning element 7 is rotated as shown in FIGS. 4a and 4c, the incident light beams to the hologram scanning element 7 are diffracted in the direction perpendicular to the straight lines of the grating which are inclined from the above initial state by the rotation of the hologram scanning element 7. The pattern of the diffraction grating of the hologram scanning element 7 is not always composed of straight lines. It may include a curved line to prevent an aberration caused by the change of the wavelength of the light beams emitted from the semiconductor laser 1.

Next, the operation of the hologram lens 8 for focusing the incident light beams on the optical disk 22 will be described.

Figure 5A:
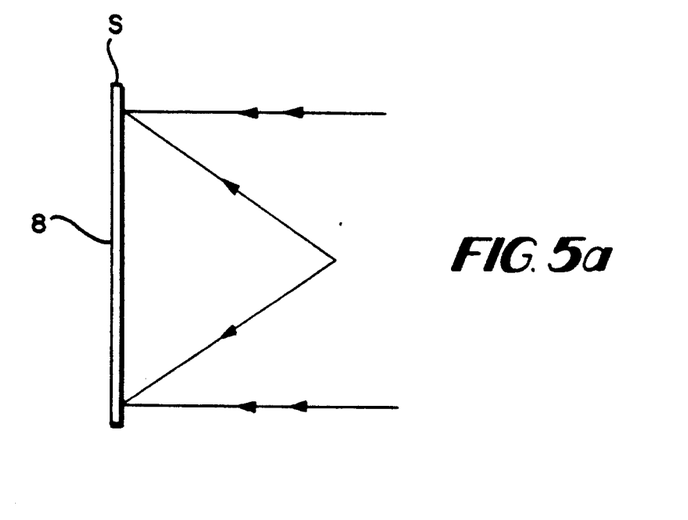
FIGS. 5a and 5b show a method for forming a pattern of a grating on a hologram lens according to the present invention.
Figure 5B:
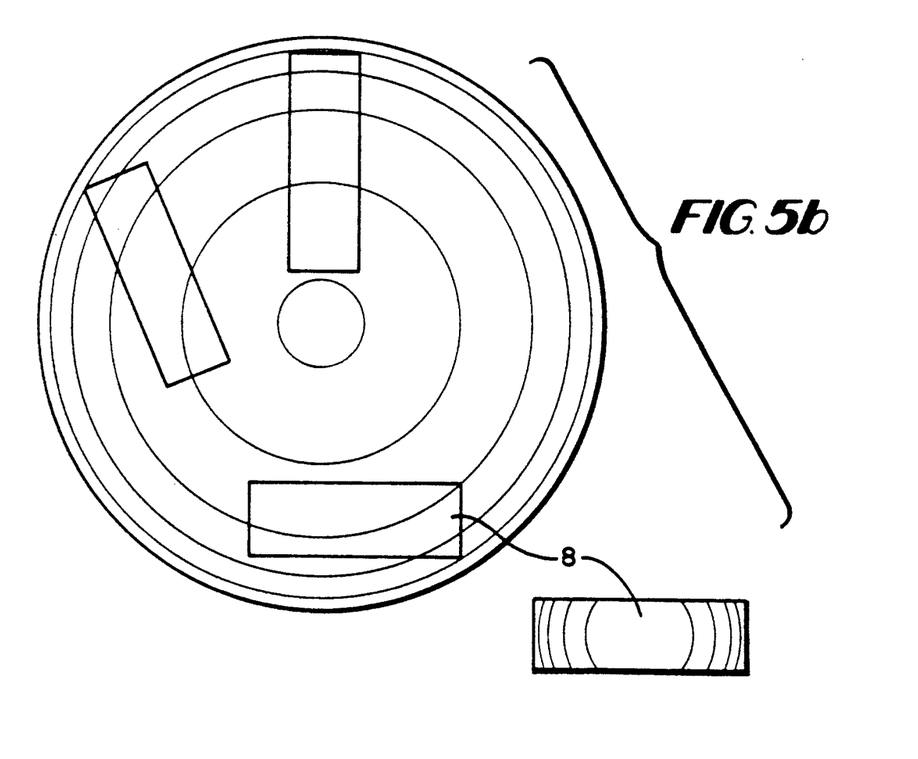

The pattern of the hologram lens 8 is formed in the following manner. As shown in FIG. 5a, basically, parallel laser beams (plane waves) are allowed to interfere with diverging laser beams (spherical waves) on a surface S, to form a pattern of interference fringes as schematically shown in FIG. 5b. A portion of the pattern is used as the pattern of the hologram lens 8. The actual pitch of the interference fringes is designed to be in the order of several microns. The two types of waves of the laser beams used for the interference may be selected from the group consisting of a plane wave, a spherical wave, and an aspherical wave, so as to obtain lens effects required for a resultant hologram or to achieve the purpose of correcting an aberration to be described later. An optimal incident direction and an optimal irradiating point of the two types of laser beams interfering with each other should be determined based on an incident angle and a focusing position of the light beams adopted when the resultant hologram lens is actually used. Alternatively, the pattern of the hologram lens 8 can be directly calculated by use of a computer (computer generated hologram).

Figure 6:
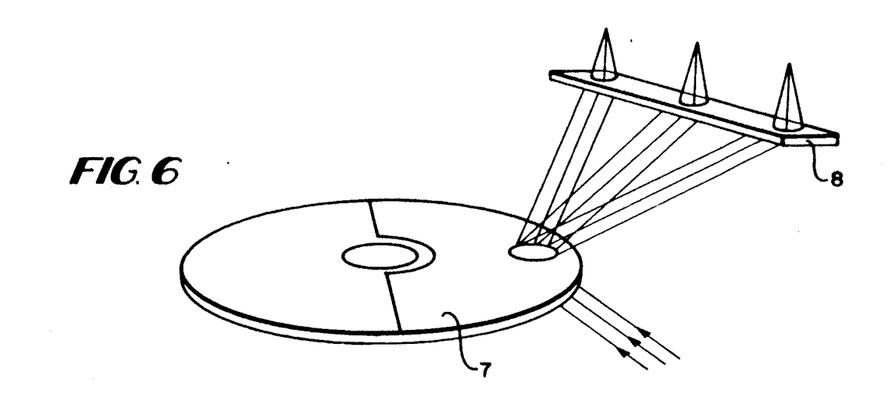
FIG. 6 shows the relation between the hologram scanning element and the hologram lens according to the present invention.

According to the hologram lens having the pattern formed in the above-described manner, as shown in FIG. 6, all of the light beams diffracted from the hologram scanning element 7 are introduced to the optical disk 22 at right angles through the hologram lens 8, whichever portion of the hologram lens 8 the light beams pass through. As shown in FIG. 5b, the hologram lens 8 can be any portion of the pattern of concentric circles. The hologram lens 8 may be made of glass (quartz) with a grating pattern thereon formed by use of a resist or as relief-type grooves, or may be made of $LiNbO_3$ with stripes formed by a proton exchange method.

Figure 7A:
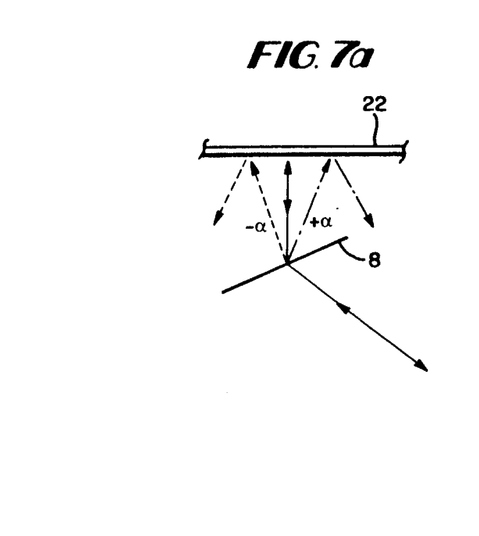
FIGS. 7a to 7c show the change of an optical axis of light beams when the wavelength of the light beams changes.

In general, when the wavelength of light beams emitted from a laser as a light source of a hologram element is changed, the diffraction angle of the light beams from the hologram element changes. Specifically, as shown in FIG. 7a, when light beams having a design wavelength f are incident to the hologram lens 8, the light beams are diffracted and introduced to the optical disk 22 at right angles and focused thereon. However, when the wavelength of the light beams is changed due to a temperature change in the semiconductor laser or mode hopping, the light beams from the hologram lens 8 are introduced to the optical disk 22 at an angle inclined from the right angle, and thus they are reflected from the optical disk 22 in an inclined direction. As a result, a displacement of the position irradiated with the light beams from a right track can not be correctly detected, making it difficult to effect the tracking control.

Figure 7B:
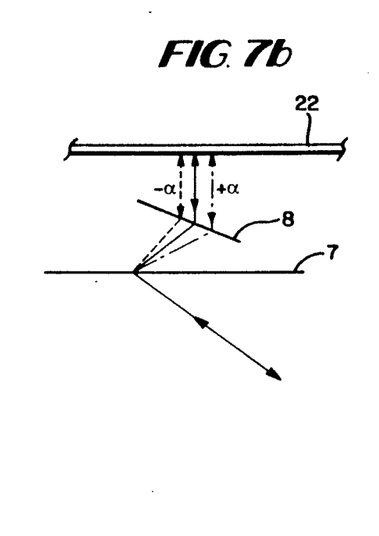
Figure 7C:
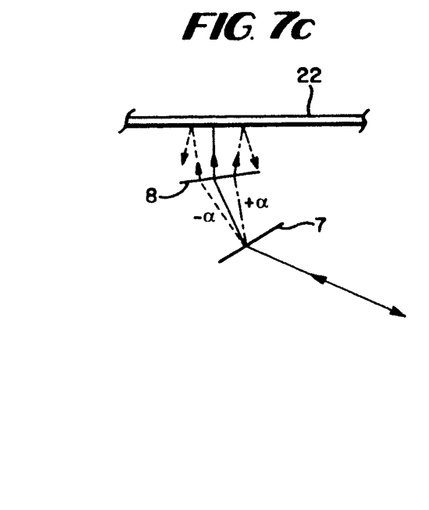

When the hologram scanning element 7 and the hologram lens 8 are arranged so that the light beams are diffracted therefrom in the directions on the same side as shown in FIG. 7c, the diffracted light beams are introduced to the optical disk 22 at an inclined angle as described above. This trouble can be prevented when the hologram scanning element 7 and the hologram lens 8 are arranged so that the direction of the light beams diffracted from the hologram scanning element 7 is reverse of that from the hologram lens 8 as shown in FIG. 7b. That is, they are arranged so that the changes of the diffraction directions of the light beams caused by the change of the wavelength thereof at the hologram scanning element 7 and at the hologram lens 8 work opposite to each other. In this way, when two hologram elements are combined, it is possible to introduce light beams to an optical disk at right angles, even when the wavelength of the light beams is changed, by arranging the two hologram elements so that the changes of the diffraction angle occurring at the respective hologram elements can be canceled as the whole optical system.

Figure 8A:
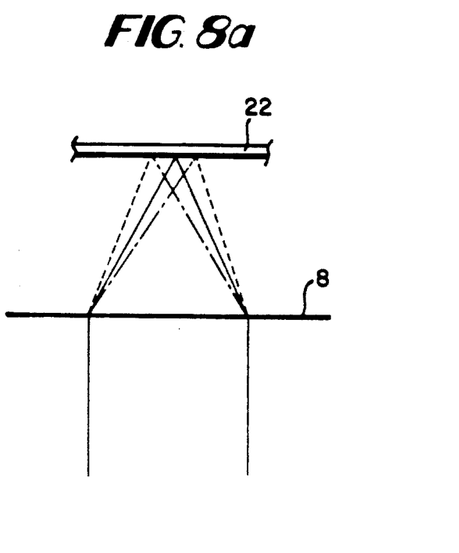
FIGS. 8a and 8b show the focusing condition of light beams on a recording medium when the wavelength of the light beams changes.
Figure 8B:
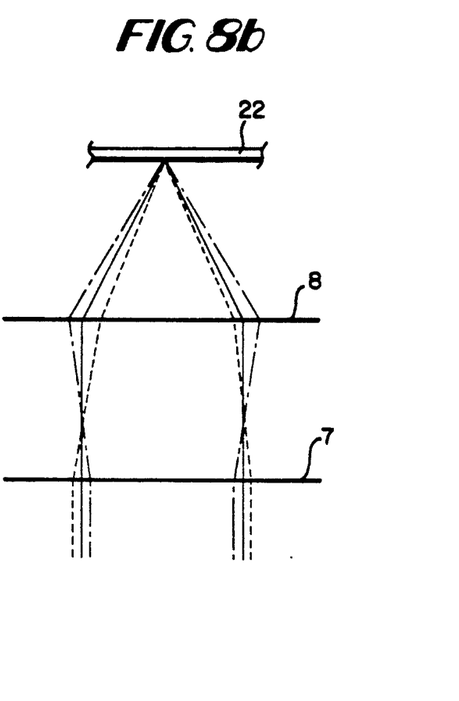

The change of the wavelength of the light beams also affects the focusing property of the hologram lens 8 as shown in FIG. 8a. That is, the light beams having a changed wavelength are not correctly focused on the optical disk 22 as shown by the dash line or the dash-dot line in FIG. 8a, causing an aberration. This trouble can be prevented by forming on the hologram scanning element 7 a diffraction grating having a pattern to be effective in correcting the aberration, that is, by providing the hologram scanning element 7 with a function of a concave lens for somewhat diverging the light beams as shown in FIG. 8b. Such a hologram scanning element can be formed by use of the interference of parallel light beams and diverging light beams. When parallel light beams are introduced to this hologram scanning element, the light beams are diverged. With this hologram scanning element, the light beams introduced to the hologram lens 8 have already been corrected in aberration, and they are then focused on the optical disk without aberration.

In this example, the tracking control is performed by moving the galvano-mirror 6. However, the tracking-cantrol is possible also by varying the amount of the rotation of the hologram scanning element 7. This can be performed by using a precision-control pulse motor or ultrasonic motor as a drive motor 13 for the rotation of the hologram scanning element 7 and disposing a rotary encoder for detecting the amount of the control with the motor, or by using a swing-type actuator similar to that used for driving a magnetic head for a fixed disk.

Figure 9A:
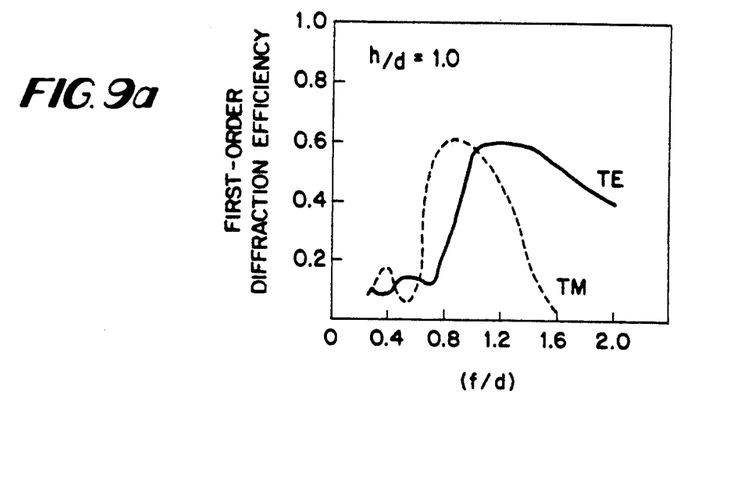
FIGS. 9a to 9c show the relationship between the wavelength of laser beams, the pitch and the groove depth of a grating, and the diffraction efficiency of the laser beams for a hologram according to the present invention.
Figure 9B:
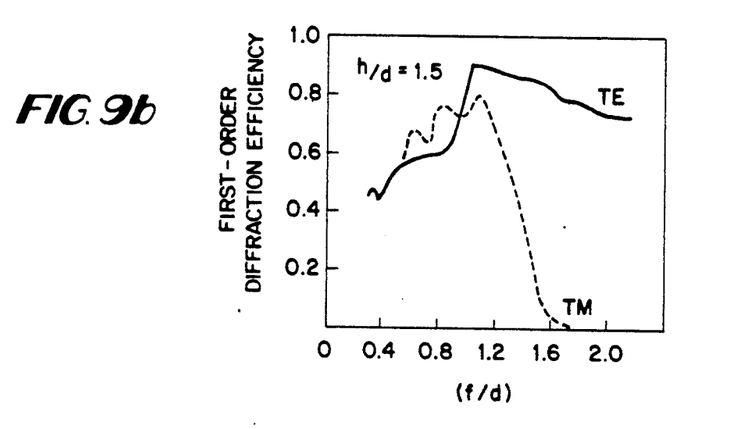
Figure 9C:
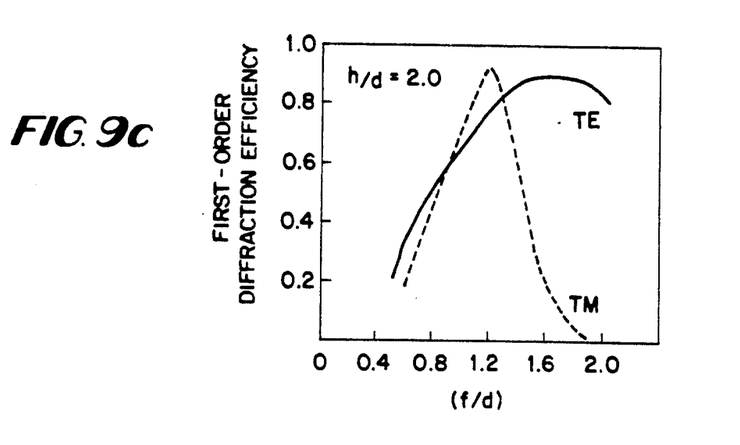

The hologram lens 8 can be provided with such polarizing properties as to increase the Kerr effect, which is an important element for reproducing signals from a recording medium when it is a magneto-optical recording medium, by appropriately designing the pitch, the duty ratio, and the groove depth of the hologram lens 8. Since a magneto-optical signal is detected from the difference of the transmittances of a p-wave and an s-wave, $T_p$ and $T_s$, when $T_p > T_s$ (the same effect obtained by the polarization beam splitter), the Kerr effect at a light detection portion is increased. Taking a first-order diffracted light beam at the Bragg angle as an example, when the refractive index of the hologram material n is 1.66, the relationship between the ratio of the groove depth h to the pitch d of the grating (h/d), the ratio of the wavelength f of the light beam to d (f/d), and the transmitted first-order diffraction efficiency is shown in FIGS. 9a, 9b, and 9c when h/d is 1.0, 1.5, and 2.0, respectively. In these FIGURES, the cases of TE and TM waves are shown. These waves are generally used for light beams propagating in an optical waveguide, and considered to correspond to the p-wave and s-wave, respectively. If the grating of the hologram lens has a uniform pitch and a pattern of straight lines, when $f/d \geq 1.2$, the Kerr effect is increased in any cases that $h/d = 1.0$, 1.5, and 2.0 (as far as the diffraction efficiency of $TM > 0$). As discussed above, an actual hologram lens is not uniform in the pitch to prevent an aberration caused by the change of the wavelength of laser beams and has a pattern of curved lines, whereby the Bragg angle varies depending on the position in the hologram. Accordingly, the hologram lens should be first designed so that properties required can be provided and that an aberration can be corrected. Thereafter, the Maxwell's wave equation should be calculated based on the design numerical analysis.

Figure 10:
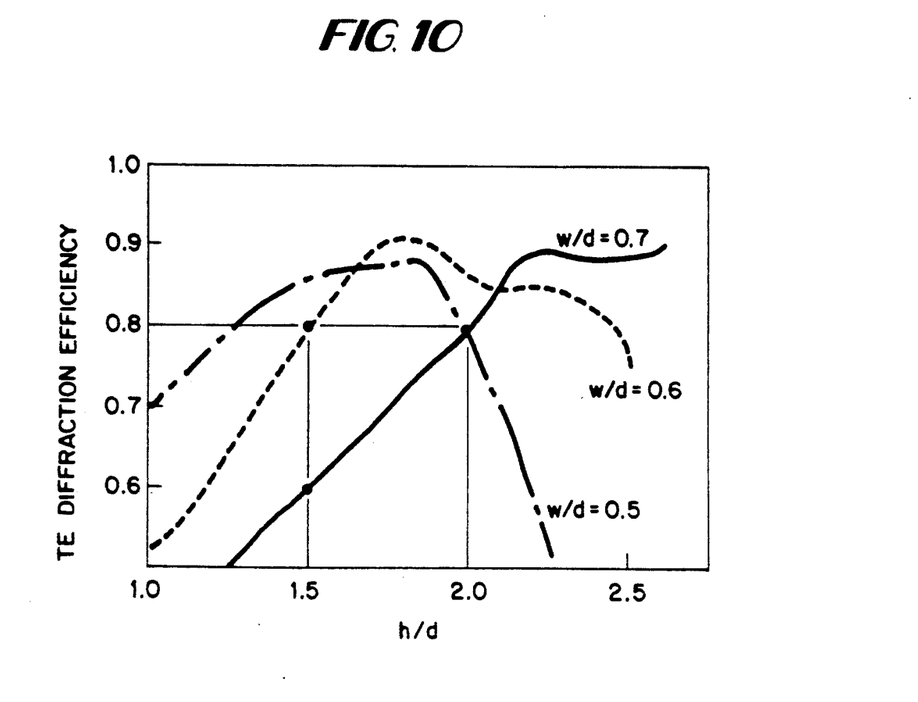
FIG. 10 shows the relationship between the wavelength of laser beams, the pitch, the width of convex portions, and the groove depth of a grating, and the TE diffraction efficiency of the laser beams for a hologram according to the present invention.

As for the diffraction grating on the hologram scanning element 7, when the lines of the grating are not perpendicular to the incident light axis as shown in FIGS. 4a and 4c (i.e., when the hologram scanning element 7 is rotated), the diffraction efficiency decreases compared with the case when the lines of the grating are perpendicular to the incident light axis as shown in FIG. 4b, under the conditions that the hologram grating is uniform in the pitch, the duty ratio, and the groove depth. The diffraction efficiency can be stabilized irrespective of the rotation of the hologram scanning element 7 by appropriately setting the pitch, the duty ratio, and the groove depth of the grating. FIG. 10 shows the relationship between the ratio of the groove depth h to the pitch d of the grating (h/d), the ratio of the width w of the convex portions of the grating to d (w/d), i.e., the duty ratio, and the TE diffraction efficiency when the grating is rectangular. According to this FIGURE, when, for example, the grating is designed to obtain a diffraction efficiency of 60% for light beams deflected at maximum and that of 80% for light beams passing without deflection, the duty ratio w/d at an incident portion of the grating should be 0.6 for the maximum deflection and 0.7 for the non-deflection. When the grating is designed to have a stable TE diffraction efficiency of 0.8, the groove depth should also be controlled so that $h/d = 2.0$ for the maximum deflection and $h/d = 1.5$ for the non-deflection.

EXAMPLE 2

Figure 2A:
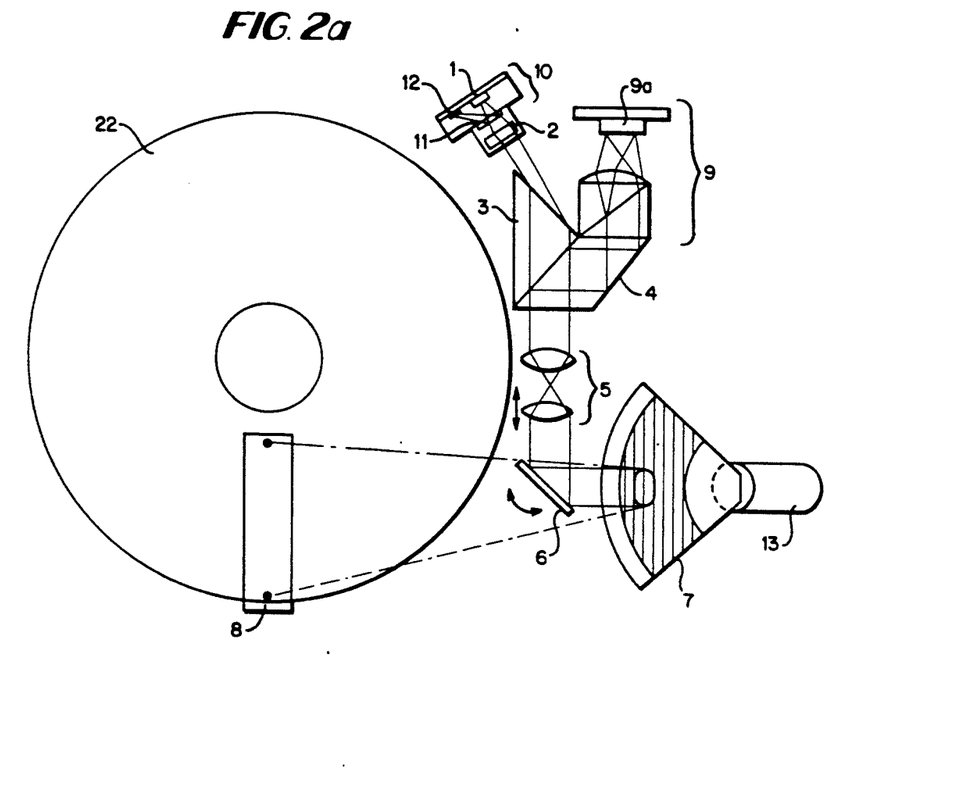
FIGS. 2a and 2b are a plan view and a side view, respectively, of another optical pickup apparatus according to the present invention.
Figure 2B:
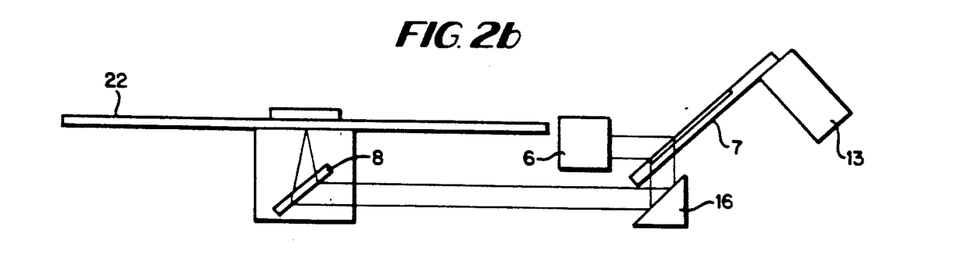
Figure 12B:
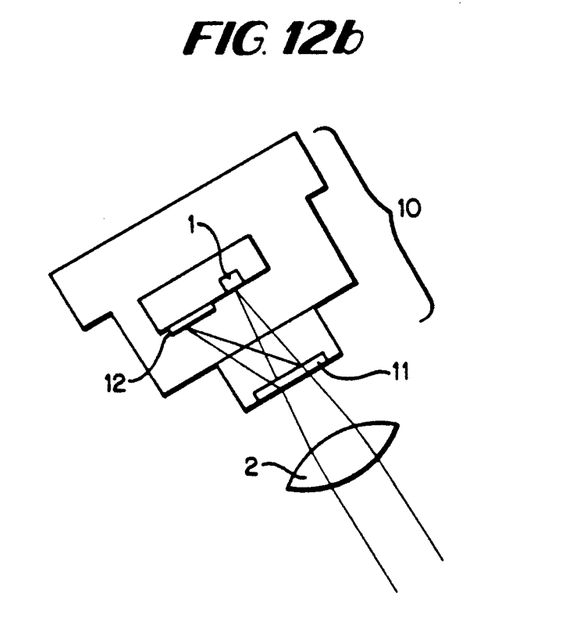

A second example of the optical pickup apparatus according to the present invention will be described as follows:

FIGS. 2a and 2b are a plan view and a side view of the optical pickup apparatus of this example, respectively. The optical pickup apparatus of this example differs from that of Example 1 in that a 45° mirror 16 is interposed between the hologram scanning element 7 and the hologram lens 8. According to this arrangement, the optical distance between the two hologram elements is longer, thereby reducing the amount of the rotation of the hologram scanning element 7 with respect to the scanning distance on the optical disk 22. Thus, according to the optical pickup apparatus of this example, a higher access speed is possible compared with that of Example 1. In this example, as described in Example 1, the hologram scanning element 7 and the hologram lens 8 are appropriately arranged so that the troubles such as an aberration caused by the change of the wavelength of light beams and the inclination of the incident angle of light beams diffracted from the hologram lens 8 to the optical disk 22 can be prevented. The hologram laser unit 10 can be constructed as shown in FIG. 12h.

In this example, the optical pickup apparatus according to the present invention was used for a magneto-optical disk unit. However, the optical pickup apparatus of this example is also applicable to any types of units using a compact disk (CD), a write once optical disk, a phase change optical disk, or an optical tape for recording and reproducing information by modulating the intensity of light beams, by removing the polarization beam splitter 4 and the data signal detecting optical system 9 from the optical pickup apparatus shown in FIGS. 2a and 2b.

In the above examples, the hologram scanning element and the hologram lens were used for the optical scanning. However, it is also possible to use a Fresnel lens to achieve the same effect as described above.

EXAMPLE 3

Figure 3A:
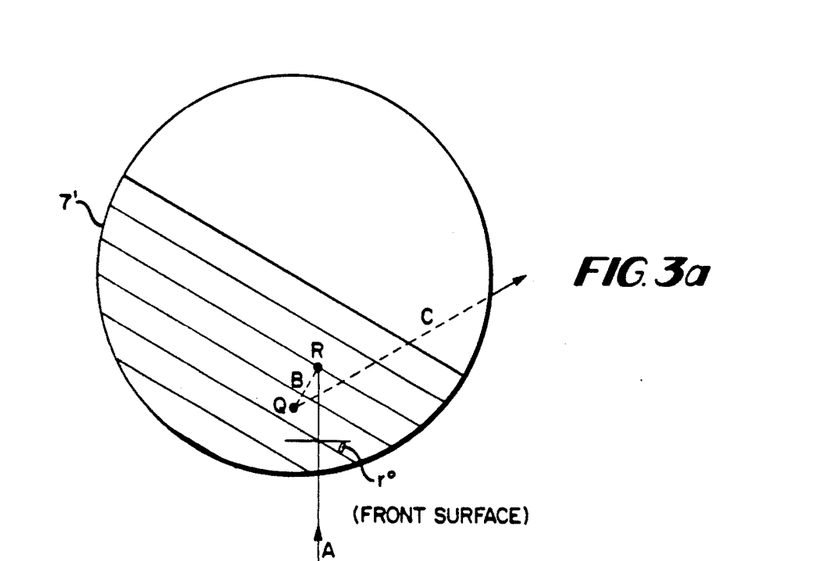
FIGS. 3a to 3c show a hologram scanning element according to the present invention.
Figures 3B, 3C:
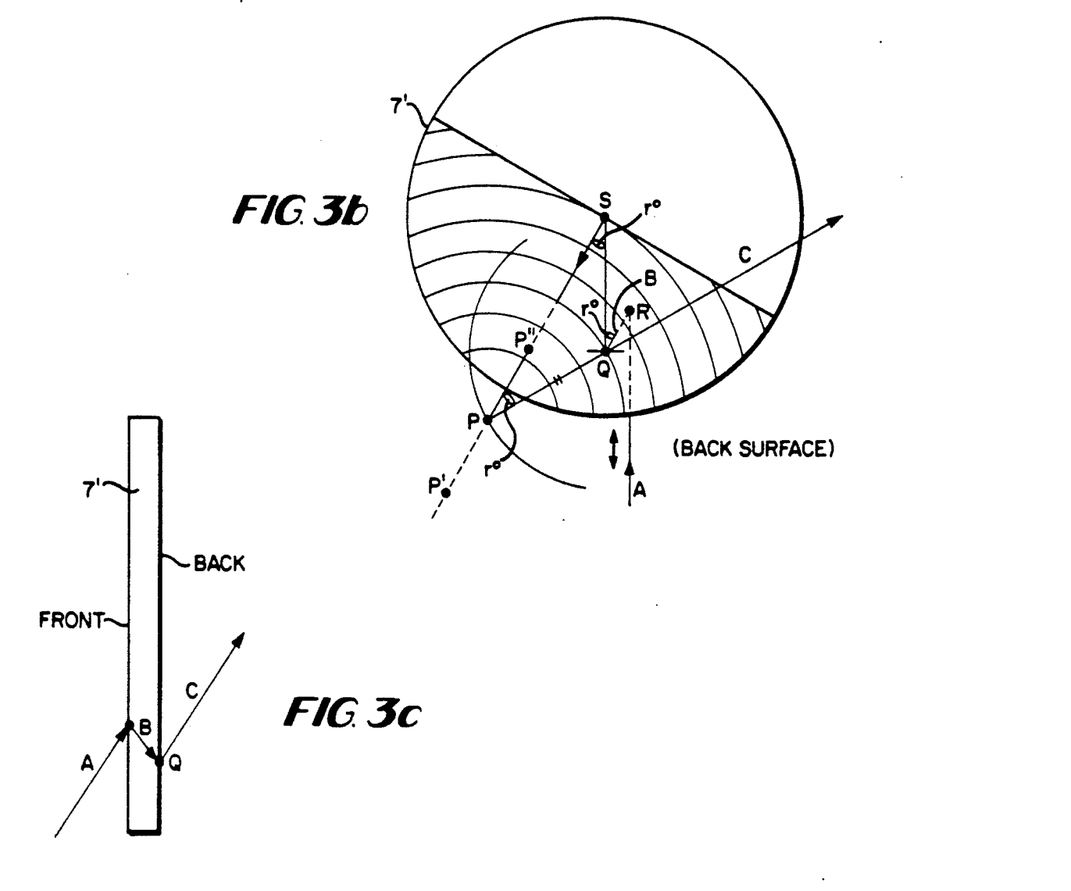

Referring to FIGS. 3a, 3b, and 3c, a third example according to the present invention will be described.

A hologram scanning element 7' of this example has gratings formed on both surfaces thereof. One of the gratings formed on the front surface of the hologram scanning element 7' has a pattern of parallel straight lines as shown in FIG. 3a. The other grating formed on the back surface thereof has a pattern of concentric circles having a center P as shown in FIG. 3b. FIG. 3c is a sectional view of the hologram scanning element 7'.

When the state where the hologram scanning element 7' is positioned so that the straight lines of the grating on the front surface thereof are perpendicular to a direction A of a light beam introduced to the hologram scanning element 7' at a point R on the front surface is an initial state, FIGS. 3a to 3c show a state where the hologram scanning element 7' is rotated by an angle r from the initial state. At this time, the light beam is diffracted from the point R in a direction B inclined by the angle r. The diffracted light beam passes inside the hologram scanning element 7' and reaches a point Ω on the back surface thereof, where it is diffracted in a direction C with the grating having a pattern of concentric circles. The direction C is perpendicular to the tangent of the concentric circle at the point Ω. That is, the direction c is on the line including the center P of the concentric circles and the point Ω. As shown in FIG. 3c, this is the Bragg diffraction with high diffraction efficiency.

Next, the determination of the center P of the concentric circles on the back surface of the hologram scanning element 7' will be described.

The center P is determined depending on the amount of an additional deflection of the light beam which has already been deflected by the angle r with the grating of the front surface of the hologram scanning element 7. When it is desired to deflect the light beam by another angle r, the deflection angle $\angle SPQ$ must be equal to the angle r, where S is a center of the rotation of the hologram scanning element 7'. Since $\angle QSP$ corresponds to the angle r, i.e., an angle of the rotation of the hologram scanning element 7', $\angle SPQ = \angle QSP = r$, and thus $QP = QB$. Accordingly, the center P of the concentric circles can be obtained as a crossing point of a straight line perpendicular to the straight lines of the grating on the front surface of the hologram scanning element 7' including the center 8 and a circle having a center of the point Q and a radium of The distance QS. Thus, when the hologram scanning element 7' with this configuration is rotated by the angle r from the initial state, the light beam from the hologram scanning element 7' is deflected by the angle 2r.

When the deflection angle from the back surface of the hologram scanning element 7' is desired to be smaller than the angle r, a center P' of the concentric circles can be determined as follows. Since ∠SP'Q corresponds to the deflection angle, the center P' should be any point on the straight line perpendicular to the straight lines of the grating on the front surface of the hologram scanning element 7' including the center S and at the same time outside a circle having a center of the center S and a radius of the distance SP. On the other hand, when the deflection angle from the back surface of the hologram scanning element 7' is desired to be larger than the angle r, a center P" of the concentric circles can be determined in the same manner as described above. That is, the center P" should be any point on the straight line perpendicular to the straight lines of the grating on the front surface of the hologram scanning element 7' including the center S and at the same time inside a circle having a center of the center S and a radium of the distance SP. The pitch of each grating on the front and back surfaces of the hologram scanning element 7' is not always uniform, but may vary depending on the setting of the diffraction angle inside the hologram scanning element 7' as shown in FIG. 3c.

According to this example, since the hologram scanning element 7' has the hologram gratings on both surfaces, the amount of the rotation thereof required for the optical scanning can be reduced, compared with a conventional hologram scanning element having a hologram grating on one side. Accordingly, the optical scanning over a wider range of an optical disk can be performed with a smaller amount of the rotation of the hologram scanning element, and thus the speed of the optical scanning is increased. The hologram scanning element 7 in Example 1 shown in FIGS. 1a and 1b can be replaced with the hologram scanning element 7' of this example, thus to further increase the access speed.

The optical scanning system described in this example can also be applied to a magneto-optical disk, a CD, a write once type disk, a phase-change type disk, and the like.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical pickup apparatus comprising:
   a light emitting means for emitting light beams;
   an optical scanning means for scanning a recording medium with said light beams;
   a hologram lens located between said optical scanning means and said recording medium for focusing said light beams at a point on said recording medium;
   an optical detector for detecting the light beams reflected from said recording medium; and
   a first optical system for directing the light beams reflected from said recording medium to said optical detector;
   wherein said optical scanning means comprises an optical diffraction means for diffracting the light beams emitted from said light emitting means and a control means for controlling the rotation of said optical diffraction means.

2. An optical pickup apparatus according to claim 1, further comprising a second optical system for directing the light beams emitted from said light emitting means to said optical scanning means.

3. An optical pickup apparatus according to claim 1, further comprising a third optical system for directing the light beams diffracted from said optical scanning means toward said recording medium.

4. An optical pickup apparatus according to claim 1, wherein said optical diffraction means is a hologram element.

5. An optical pickup apparatus according to claim 4, wherein said hologram element comprises a grating for correcting an aberration caused by the change of the wavelength of the light beams when the light beams emitted from said light emitting means are focused on said recording medium.

6. An optical pickup apparatus according to claim 4, wherein said hologram element functions as a concave lens for diverging said light beams.

7. An optical pickup apparatus according to claim 1, wherein said optical diffraction means is a hologram element, said hologram element and said hologram lens being arranged so that the direction of the diffracted light axis at said hologram element is reverse of that at said hologram lens.

8. An optical pickup apparatus according to claim 1, further comprising a galvano-mirror for the tracking control for radiating the light beams to a right track on said recording medium, said galvano-mirror being disposed between said light emitting means and said optical scanning means.

9. An optical pickup apparatus according to claim 1, further comprising a relay lens arrangement for the focusing control, said relay lens arrangement being disposed between said light emitting means and said optical scanning means.

10. An optical pickup apparatus according to claim 1, wherein said control means comprises a motor for the precision control of said optical diffraction means and a rotary encoder for detecting the amount of the rotation of said motor.

11. An optical pickup apparatus according to claim 10, wherein said motor is a pulse motor.

12. An optical pickup apparatus according to claim 10, wherein said motor is an ultrasonic motor.

13. An optical pickup apparatus according to claim 1, wherein a transmittance of a p-polarized light of said hologram lens is higher than a transmittance of an s-polarized light of said hologram lens.

14. An optical pickup apparatus according to claim 1, wherein said hologram lens comprises a grating having a pattern of straight lines at a regular pitch, and a ratio of a wavelength of said light beams to said pitch is at least 1.2.

15. A hologram element for optical scanning, being rotated under control, the hologram element comprising:

a light-transmitting substrate having a first surface with a first hologram formed thereon and a second surface with a second hologram formed thereon;

wherein the first hologram has a grating of approximately straight lines, and the second hologram has a grating of concentric arcs having a center on an imaginary straight line, said imaginary straight line being perpendicular to the straight lines of the grating of the first hologram and including a center of the rotation of said hologram element.

16. An optical pickup apparatus comprising:

a light emitting means for emitting light beams;

an optical scanning means for scanning a recording medium with said light beams;

a light focusing means for focusing said light beams on said recording medium;

an optical detector for detecting the light beams reflected from said recording medium; and a first optical system for detecting the light beams reflected from said recording medium to said optical detector;

wherein said optical scanning means comprises an optical diffraction means for diffracting the light beams emitted from said light emitting means and a control means for controlling the rotation of said optical diffraction means, said optical diffraction means including a hologram element comprising a light-transmitting substrate having a first surface with a first hologram formed thereon and a second surface with a second hologram formed thereon, wherein the first hologram has a grating of approximately straight lines, and the second hologram has a grating of concentric arcs having a center on an imaginary straight line, said imaginary straight line being perpendicular to the straight lines of the grating of the first hologram and including a center of the rotation of said hologram element.

* * * * *

UNITED STATES PATENT AND TRADEMARK OFFICE
CERTIFICATE OF CORRECTION

PATENT NO. : 5,331,621
DATED : July 19, 1994
INVENTOR(S) : Takahiro Miyake et al It is certified that error appears in the above-indentified patent and that said Letters Patent is hereby corrected as shown below:

On the title page: Item[75] change the name of Inventors "Katushiro Kubo" to --Katsuhiro Kubo -- and "Kukio Kubata" to --Yukio Kurata --.

Column 1, lines 35 and 60, change "systems" to --system--.

Column 8, line 8, change "Fig. 12h" to --Fig. 12b--.

Column 8, lines 45, 49 and 51, change "Ω" to --Q--.

Column 8, line 50, change "direction c" to --direction C--.

Column 9, line 3, change "center 8" to --center S--.

Column 9, line 4, change "The" to --the--.

Signed and Sealed this

Eighth Day of November, 1994

*Attest:*

BRUCE LEHMAN

*Attesting Officer*  *Commissioner of Patents and Trademarks*